United States Patent [19]

Kage et al.

[11] Patent Number: 5,714,220

[45] Date of Patent: Feb. 3, 1998

[54] CONTAINER COMPOSED OF A SATURATED POLYESTER RESIN COMPOSITION

[75] Inventors: Tsuyoshi Kage, Kashiwa; Koji Takahashi, Kuga-gun; Hideki Sakai, Kuga-gun; Takashi Hiraoka, Kuga-gun, all of Japan

[73] Assignees: Mitsui Petrochemical Industries, Ltd.; Kirin Beer Kabushiki Kaisha, both of Tokyo, Japan

[21] Appl. No.: 568,796

[22] Filed: Dec. 7, 1995

Related U.S. Application Data

[63] Continuation of Ser. No. 338,812, Nov. 10, 1994, abandoned.

[30] Foreign Application Priority Data

Nov. 11, 1993 [JP] Japan ................... 5-282733

[51] Int. Cl.$^6$ ................................................. B29D 22/00
[52] U.S. Cl. ........................ 428/36.8; 428/36.92; 525/64; 525/166; 525/176
[58] Field of Search ................. 428/36.92, 36.8; 525/166, 64, 176

[56] References Cited

U.S. PATENT DOCUMENTS

| | | | |
|---|---|---|---|
| 3,852,101 | 12/1974 | Batchelor, Jr. ................... | 524/195 |
| 4,064,103 | 12/1977 | Cordes et al. ................... | 524/195 |
| 4,219,628 | 8/1980 | Weemes et al. ................... | 525/166 |
| 4,525,504 | 6/1985 | Morris et al. ................... | 524/101 |
| 5,310,787 | 5/1994 | Kutsuwa et al. ................... | 525/166 |

FOREIGN PATENT DOCUMENTS

| | | |
|---|---|---|
| 0056449 | 10/1981 | European Pat. Off. . |
| 0194808 | 3/1986 | European Pat. Off. . |
| 0309400 | 9/1988 | European Pat. Off. . |
| 0333414 | 3/1989 | European Pat. Off. . |
| 2280681 | 8/1975 | France . |
| 0138054 | 10/1979 | Japan ................... 525/166 |

*Primary Examiner*—Patricia A. Short
*Attorney, Agent, or Firm*—Sherman and Shalloway

[57] ABSTRACT

The container according to the invention is composed of a saturated polyester resin composition comprising a saturated polyester [A] in an amount of 50 to 95 parts by weight, a metallic salt of an ethylene/unsaturated carboxylic acid copolymer [B] in an amount of 0.5 to 20 parts by weight, a modified ethylene/α-olefin copolymer rubber [C] in an amount of 0.5 to 30 parts by weight, a benzotriazole type weathering stabilizer [D] in an amount of 0.01 to 2.0 parts by weight and a hindered amine type weathering stabilizer [E] in an amount of 0 to 2.0 parts by weight, and if necessary, a carbodiimide compound [F] in an amount of 0.01 to 5.0 parts by weight, the amounts of said components [D], [E] and [F] being each based on 100 parts by weight of the total amounts of the components [A], [B] and [C]. The container of the invention is excellent in not only low-temperature impact strength but also rigidity, weld strength, weathering resistance and fade resistance.

9 Claims, 1 Drawing Sheet

Fig. 1C gate position

Fig. 2 gate          gate

CONTAINER COMPOSED OF A SATURATED POLYESTER RESIN COMPOSITION

This application is a continuation, of application Ser. No. 08/338,812, filed Nov. 10, 1994, now abandoned.

FIELD OF THE INVENTION

The present invention relates to a container composed of a saturated polyester resin composition, and more particularly to a container composed of a saturated polyester resin composition excellent in low-temperature impact strength, rigidity, weld-strength, weathering resistance and fade resistance.

BACKGROUND OF THE INVENTION

Of various thermoplastic resins, a saturated polyester such as polyethylene terephthalate is excellent especially in mechanical strength and heat resistance.

With respect to uses of such saturated polyester, it is not curious that the saturated polyester is molded into containers, pallets, etc. by means of, for example, injection molding.

However, the containers composed of the saturated polyester are poor in low-temperature impact strength, and there is involved such a problem that they are greatly reduced in the low-temperature impact strength especially when crystallized.

Further, the containers composed of the saturated polyester are sometimes lowered in the mechanical strength as compared with the strength just after the preparation, if they are used outdoors for a long period of time.

OBJECT OF THE INVENTION

The present invention has been made under such circumstances as mentioned above, and it is an object of the invention to provide a container composed of a saturated polyester resin composition excellent in low-temperature impact strength, weathering resistance and fade resistance as well as rigidity and weld strength.

SUMMARY OF THE INVENTION

The container according to the invention is composed of a saturated polyester resin composition comprising:

[A] a saturated polyester which is derived from a dicarboxylic acid containing a terephthalic acid and a diol containing ethylene glycol and has an intrinsic viscosity $[\eta]$ of 0.5 to 1.4 dl/g, in an amount of 50 to 95 parts by weight;

[B] a metallic salt of an ethylene/unsaturated carboxylic acid copolymer in an amount of 0.5 to 20 parts by weight;

[C] a modified ethylene/α-olefin copolymer rubber obtained by graft modifying an ethylene/α-olefin copolymer rubber with an unsaturated carboxylic acid or its derivative, in an amount of 0.5 to 30 parts by weight;

[D] a benzotriazole type weathering stabilizer in an amount of 0.01 to 2.0 parts by weight based on 100 parts by weight of the total amounts of the components [A], [B] and [C];

[E] a hindered amine type weathering stabilizer in an amount of 0 to 2.0 parts by weight based on 100 parts by weight of the total amounts of the components [A], [B] and [C]; and if necessary

[F] a carbodiimide compound in an amount of 0.01 to 5.0 parts by weight based on 100 parts by weight of the total amounts of the components [A], [B] and [C].

The unsaturated carboxylic-acid for forming the metallic salt of an ethylene/unsaturated carboxylic acid copolymer [B] is preferably an acrylic acid and/or a methacrylic acid.

The modified ethylene/α-olefin copolymer rubber [C] is preferably an ethylene/α-olefin copolymer rubber graft modified with a maleic acid or maleic anhydride, more preferably an ethylene/propylene copolymer rubber graft modified with a maleic acid or maleic anhydride.

The container according to the invention is excellent in not only low-temperature impact strength but also rigidity, weld strength, weathering resistance and fade resistance.

BRIEF DESCRIPTION OF THE DRAWINGS

FIG. 1 shows a container manufactured in the examples of the invention.

DETAILED DESCRIPTION OF THE INVENTION

The container according to the invention will be described in detail hereinafter.

The container of the invention is composed of a polyester resin composition comprising:

[A] a saturated polyester,

[B] a metallic salt of an ethylene/unsaturated carboxylic acid copolymer,

[C] a modified ethylene/α-olefin copolymer rubber,

[D] a benzotriazole type weathering stabilizer, and if necessary

[E] a hindered amine type weathering stabilizer, and/or

[F] a carbodiimide compound.

First of all, these components are illustrated below.

[A] Saturated polyester

The saturated polyester used in the invention is derived from a dicarboxylic acid containing a terephthalic acid and a diol containing ethylene glycol.

This saturated polyester is obtained by polycondensing a dicarboxylic acid containing a terephthalic acid or its ester derivative (e.g., lower alkyl ester of terephthalic acid, phenyl ester of terephthalic acid) and a diol containing ethylene glycol or its ester derivative (e.g., ethylene oxide monocarboxylic ester).

The saturated polyester used in the invention may be either homopolyethylene terephthalate derived from the above-mentioned terephthalic acid and ethylene glycol or a copolymerized polyester obtained by using, as a dicarboxylic acid, other dicarboxylic acid than the terephthalic acid in addition to the terephthalic acid and using, as a diol, other diol compound than ethylene glycol in addition to ethylene glycol. If the saturated polyester is such a copolymerized polyester as mentioned above, this polyester may contain constituent units derived from the dicarboxylic acid other than the terephthalic acid and the diol other than ethylene glycol in amounts of not more than 20% by mol.

Examples of the dicarboxylic acids other than the terephthalic acid include:

aromatic dicarboxylic acids, such as phthalic acid (orthophthalic acid), isophthalic acid, naphthalenedicarboxylic acid, diphenyldicarboxylic acid and diphenoxyethanedicarboxylic acid;

aliphatic dicarboxylic acids, such as adipic acid, sebacic acid, azelaic acid and decanedicarboxylic acid;

alicyclic dicarboxylic acids, such as cyclohexanedicarboxylic acid; and ester derivatives thereof.

Of these, preferred are orthophthalic acid and isophthalic acid. These dicarboxylic acids may be used in combination of two or more kinds.

Examples of the diols other than ethylene glycol include:

aliphatic glycols, such as diethylene glycol, trimethylene glycol (propylene glycol), tetramethylene glycol, neopentyl glycol, hexamethylene glycol, dodecamethylene glycol, diethylene glycol, triethylene glycol, tetraethylene glycol and polyethylene glycol;

alicyclic glycols, such as cyclohexanedimethanol;

aromatic diols, such as bisphenols, hydroquinone and 2,2-bis(4-β-hydroxyethoxyphenyl)propane; and ester derivatives thereof.

Of these, preferred are diethylene glycol and cyclohexanedimethanol. These diols may be used in combination of two or more kinds.

The saturated polyester resin for use in the invention may contain constituent units derived from polyfunctional compounds such as trimesic acid, pyromellitic acid, trimethylolethane, trimethylolpropane, trimethylolmethane and pentaerythritol, in small amounts, e.g., not more than 2% by mol.

In such a copolymerized polyester as mentioned above, the ethylene terephthalate constituent units and the constituent units derived from other dicarboxylic acid than the terephthalic acid and/or other diol than ethylene glycol are arranged at random.

The saturated polyester has a substantially linear structure, even if it is polyethylene terephthalate or a copolymerized polyester, and this can be confirmed by the fact that the saturated polyester is soluble in o-chlorophenol.

The saturated polyester resin for use in the invention has an intrinsic viscosity [η], as measured in o-chlorophenol at 25° C., of usually 0.5 to 1.4 dl/g, preferably 0.55 to 1.0 dl/g, more preferably 0.6 to 0.9 dl/g.

The saturated polyester having an intrinsic viscosity [η] of the above value is excellent in mechanical strength as well as melt moldability.

The saturated polyester resin used in the invention is desired to have a glass transition temperature (Tg) of usually 50° to 120° C., preferably 60° to 100° C.

Further, this saturated polyester resin is also desired to have a melting point (Tm) of usually 210° to 265° C., preferably 220° to 260° C.

In the present invention, either "virgin saturated polyesters" commercially available usually in the form of pellets or "regrind of saturated polyesters" may be used as the saturated polyester. If desired, the virgin saturated polyester and the regrind of saturated polyester may be blended with each other in an appropriate proportion.

In this specification, the term "virgin saturated polyester" is used to intend a saturated polyester which has never been molded into bottles or preforms by being passed through a molding machine in the molten state, while the term "regrind of saturated polyester" is used to intend a saturated polyester obtained by passing the virgin saturated polyester in the molten state through a molding machine at least once, followed by pulverizing. The operation of passing the molten virgin saturated polyester through a molding machine comprises the steps of heating pellets (chips) of the virgin saturated polyester to melt them and molding the molten polyester into products of desired forms such as preforms or bottles.

[B] The metallic salt of an ethylene/unsaturated carboxylic acid copolymer for use in the invention is an ionic salt obtained by neutralizing carboxyl groups in a copolymer of ethylene and an α,β-unsaturated carboxylic acid in part or in whole with metallic cations.

Examples of the α,β-unsaturated carboxylic acids include unsaturated carboxylic acids of 3 to 8 carbon atoms such as acrylic acid, methacrylic acid, maleic acid, itaconic acid, maleic anhydride, monomethyl maleate and monoethyl maleate.

Examples of the metallic cations for neutralizing the carboxyl groups in the copolymer of ethylene and the unsaturated carboxylic acid include monovalent or divalent metallic cations such as $Na^+$, $K^+$, $Li^+$, $Zn^+$, $Zn^{++}$, $Mg^{++}$, $Ca^{++}$, $Co^{++}$, $Ni^{++}$, $Mn^{++}$, $Pb^{++}$ and $Cu^{++}$. The residual carboxyl groups, which are not neutralized with the metallic cations, may be partly esterified with lower alcohols.

The metallic salt of an ethylene/unsaturated carboxylic acid copolymer used in the invention is a metallic salt of a copolymer of ethylene and the unsaturated carboxylic acid, as described above. The ethylene/unsaturated carboxylic acid copolymer for forming the metallic salt contains constituent units derived from ethylene in amounts of 80 to 99% by mol, preferably 85 to 98% by mol, and contains constituent units derived from the unsaturated carboxylic acid (constituent units having carboxyl group) in amounts of 1 to 20% by mol, preferably 2 to 15% by mol.

In the metallic salt of an ethylene/unsaturated carboxylic acid copolymer for use in the invention, a part or the whole of the carboxyl groups, specifically 15 to 100% of the carboxyl groups, in the ethylene/unsaturated carboxylic acid copolymer are neutralized with the above-mentioned metallic cations. The neutralization degree of the carboxyl groups is in the range of preferably 20 to 80 more preferably 30 to 70%, and a composition comprising the metallic salt of ethylene/unsaturated carboxylic acid copolymer having such neutralization degree as defined above shows excellent melt extrusion properties.

Examples of such metallic salts of ethylene/unsaturated carboxylic copolymers include those obtained by neutralizing the carboxyl groups in the copolymers of ethylene and unsaturated monocarboxylic acids such as acrylic acid and methacrylic acid or the carboxyl groups in the copolymers of ethylene and unsaturated dicarboxylic acids such as maleic acid and itaconic acid, in part or in whole, with metallic ions such as sodium, potassium, lithium, zinc, magnesium and calcium. More specifically, there can be mentioned those obtained by neutralizing 30 to 70% of the carboxyl groups in the copolymer of ethylene and an acrylic or methacrylic acid (amount of constituent units having carboxyl group: 2 to 15 by mol) with monovalent metallic ion such as Na or divalent metallic ion such as Zn.

The metallic salt of ethylene/unsaturated carboxylic acid copolymer is known as an ionomer. As such metallic salt of ethylene/unsaturated carboxylic acid copolymer, commercially available ones, e.g., "Hi-milan" (trade name, available from Mitsui Dupont Polychemical Co.) can be employed.

(C) Modified ethylene/α-Olefin copolymer rubber

The modified ethylene/α-olefin copolymer rubber for use in the invention is an ethylene/α-olefin copolymer rubber graft modified with an unsaturated carboxylic acid or its derivative.

Examples of the ethylene/α-olefin copolymer rubber (i) to be subjected to graft modification (graft copolymerization)

include random copolymers of ethylene and α-olefins of three or more carbon atoms, and examples of the α-olefins of three or more carbon atoms include propylene, 1-butene, 1-pentene, 4-methyl-1-pentene, 1hexene, 1-octene, 1-decene and 1-dodecene.

This ethylene/α-olefin copolymer rubber (i) desirably contains constituent units derived from ethylene in amounts of 50 to 95% by mol, preferably 55 to 93% by mol.

Further, the ethylene/α-olefin copolymer rubber (i) is a low-crystalline or non-crystalline copolymer, and desirably has a crystallinity, as measured by X-ray diffractometry, of less than 40%, preferably less than 30 This ethylene/α-olefin copolymer rubber (i) desirably has an intrinsic viscosity [η] of usually 0.5 to 7 dl/g, preferably 0.7 to 5 dl/g, and a glass transition temperature (Tg) of usually not higher than −10 ° C., preferably not higher than −20° C.

In the present invention, an ethylene/propylene copolymer rubber is preferably used as the ethylene/α-olefin copolymer rubber (i).

Examples of the unsaturated carboxylic acids or their derivatives for graft modifying the ethylene/α-olefin copolymer rubber (i) include unsaturated carboxylic acids such as acrylic acid, methacrylic acid, α-methylacrylic acid, maleic acid, fumaric acid, itaconic acid, citraconic acid, tetrahydrophthalic acid and methyltetrahydrophthalic acid; and acid halides, amides, imides, acid anhydrides and ester derivatives of these unsaturated dicarboxylic acids.

Examples of the unsaturated dicarboxylic acid derivatives include malenyl chloride, maleimide, maleic anhydride, citraconic anhydride, monomethyl maleate, dimethyl maleate and glycidyl maleate.

Of these, preferred are unsaturated dicarboxylic acids and acid anhydrides thereof, and particularly preferred are maleic acid, nadic acid and acid anhydrides thereof.

These unsaturated carboxylic acids and their derivatives may be used in combination of two or more kinds.

In the modified ethylene/α-olefin copolymer rubber used for the invention, it is desired that the unsaturated carboxylic acid or its derivative (ii) is subjected to graft polymerization in an amount of 0.05 to 5% by mol, preferably 0.1 to 3% by mol, based on the amount of the ethylene/α-olefin copolymer rubber (i).

In the present invention, two or more kinds of the modified ethylene/α-olefin copolymer rubbers may be used in combination.

[D] Benzotriazole type weathering stabilizer

The benzotriazole type weathering stabilizer for use in the invention is a compound having at least one benzotriazole skeleton in the molecule, and this benzotriazole skeleton may have a substituent such as halogen or an aromatic hydrocarbon group.

Examples of the halogens include fluorine, chlorine and bromine. Of these, preferred is chlorine.

The aromatic hydrocarbon group is, for example, a phenyl group.

Examples of other substituents than the above-mentioned ones include polar groups such as hydroxyl group, carboxyl group, acid anhydride, ester group, carbonyl group and ether group; and alkyl groups.

Of such polar groups as mentioned above, preferred are hydroxyl group, ester group and ether group. Particularly preferred are hydroxyl group and ether group.

Examples of the alkyl groups include methyl, ethyl, propyl, isopropyl, butyl, tert-butyl, pentyl, tert-amyl, hexyl, heptyl, octyl and tert-octyl. Of these, preferred are methyl, ethyl, tert-butyl and tert-octyl.

The benzotriazole type weathering stabilizer for use in the invention is preferably a compound having at least one benzotriazole skeleton and having at least one hydroxyl group in the molecule.

Listed below are examples of the benzotriazole type weathering stabilizers.

2-(2'-Hydroxy-5'-methylphenyl)benzotriazole, 2-(2'-Hydroxy-3'-tert-butyl-5'-methylphenyl)-5-chlorobenzotriazole, 2-(2'-Hydroxy-3', 5'-di-tert-butylphenyl)benzotriazole, 2-(2'-Hydroxy-3', 5'-di-tert-butylphenyl)-5-chlorobenzotriazole, 2-(2'-Hydroxy-5'-tert-octylphenyl)benzotriazole, 2-(2'-Hydroxy-4'-octoxyphenyl)benzotriazole, 2-(2'-Hydroxy-3',5'-di-tert-amylphenyl)benzotriazole, 2-(2'-Hydroxy-3',5'-bis(2-phenylisopropyl)phenyl) benzotriazole, and 2-(4'-Octoxy-2-hydroxyphenyl)benzotriazole.

Of these, preferred are the following compounds.

2-(2'-Hydroxy-3'-tert-butyl-5'-methylphenyl)-5-chlorobenzotriazole, 2-(2'-Hydroxy-5'-tert-octylphenyl)benzotriazole, 2-(2'-Hydroxy-4'-octoxyphenyl)benzotriazole, and 2-(2'-Hydroxy-3',5'-bis(2-phenylisopropyl)phenyl) benzotriazole.

Also employable as the benzotriazole type weathering stabilizer are commercially available ones such as:

TINUVIN 234 (produced by Ciba Geigy Ltd., chemical name: 2-(2'-hydroxy-3',5'-bis(2-phenylisopropyl) phenyl)benzotriazole), TINUVIN 326 (produced by Ciba Geigy Ltd., chemical name: 2-(2'-hydroxy-3'-tert-butyl-5'-methylphenyl)-5-chlorobenzotriazole), and Cyasorb UV5411 (produced by Cyanamid Co., chemical name: 2-(2'-Hydroxy-5'-tert-octylphenyl) benzotriazole).

[E] Hindered amine type weathering stabilizer

The hindered amine type weathering stabilizer for use in the invention is a compound having at least one piperidyl group, preferably at least two piperidyl group, and the stabilizer may be a compound of either monomer type, oligomer type or polymer type.

To the piperidyl group may be bonded substituents such as halogen, aromatic hydrocarbon group, alkyl group, hydroxyl group, carboxyl group, acid anhydride, ester group, carbonyl group and ether group.

Examples of the halogens include fluorine, chlorine and bromine. Of these, preferred is chlorine.

Examples of the alkyl groups include methyl, ethyl, propyl, isopropyl, butyl, tert-butyl, pentyl, tert-amyl, hexyl, heptyl, octyl and tert-octyl groups. Of these, preferred are methyl, ethyl, tert-butyl and tert-octyl groups.

Listed below are examples of the hindered amine type weathering stabilizers.

-continued

(11)

(12)

(13)

(14)

(15)

(16)

(17)

(18)

(19)

In the above formulas, $R^a$, $R^b$, $R^c$ and $R^d$ are each independently an alkyl group or a hydroxyl group, and n is the number of recurring units.

Also employable as the hindered amine type weathering stabilizer are commercially available ones such as:

Sanol LS770 represented by the above chemical formula (1) (produced by Sankyo Co., Ltd.), Chimassorb 119FL represented by the above chemical formula (8) (produced by Ciba Geigy Ltd., oligomer type), and Chimassorb 944 represented by the above chemical formula (5) (produced by Ciba Geigy Ltd., oligomer type having a molecular weight of 3,000).

[F] Carbodimide compound

The carbodiimide compound for use in the invention is a compound having at least one carbodiimide group in one molecule.

Examples of the carbodiimide compounds include carbodiimides substituted with alkyl groups (including cycloalkyl groups) and carbodiimides substituted with aryl groups, such as dicyclohexylcarbodiimide and diphenylcarbodiimide.

Also employable as the carbodiimide compound are polycarbodiimides (polymers or oligomers) obtained by bonding plural carbodiimide groups.

Examples of the polycarbodiimides include:
poly(hexamethylenecarbodiimide), poly(cyclohexylenecarbodiimide),
poly(tolylcarbodiimide),
poly(4,4'-diphenylmethanecarbodiimide),
poly(3,3'-dimethyl-4,4'-biphenylmethanecarbodiimide),
poly(paraphenylenecarbodiimide),
poly(metaphenylenecarbodiimide), and
a polymer of bis(2,2',4,4',6,6'-hexaisopropylphenylcarbodiimide).

These polycarbodiimides can be derived from compounds having two or more isocyanate groups.

In the present invention, preferably used as the carbodiimide compound (F) are those having two or more carbodiimide groups in the molecule, for example, polycarbodiimides obtained by bonding plural carbodiimide groups. More specifically, preferably used are poly(tolylcarbodiimide), poly(4,4'-diphenylmethanecarbodiimide) and a polymer of bis(2,2',4,4',6,6'-hexaisopropylphenylcarbodiimide). The polycarbodiimide compound may be either a polymer (high-molecular weight type) or an oligomer.

These carbodiimide compounds may be used in combination of two or more kinds.

Saturated polyester resin composition

The saturated polyester resin composition used for the invention comprises the above-described components, and amounts thereof are as follows:

[A] the saturated polyester in an amount of 50 to 95 parts by weight, preferably 60 to 90 parts by weight,

[B] the metallic salt of ethylene/unsaturated carboxylic acid copolymer in an amount of 0.5 to 20 parts by weight, preferably 5 to 20 parts by weight,

[C] the modified ethylene/α-olefin copolymer rubber in an amount of 0.5 to 30 parts by weight, preferably 5 to 30 parts by weight,

[D] the benzotriazole type weathering stabilizer in an amount of 0.01 to 2.0 parts by weight, preferably 0.05 to 1.0 part by weight based on 100 parts by weight of the total amounts of the components [A], [B] and [C], and

[E] the hindered amine type weathering stabilizer in an amount of 0 to 2.0 parts by weight, preferably 0.05 to 1.0 part by weight based on 100 parts by weight of the total amounts of the components [A], [B] and [C].

In addition to the above-mentioned components, the saturated polyester resin composition may further contain the carbodiimide compound [F] in an amount of 0.01 to 5.0 parts by weight, preferably 0.02 to 2.0 parts by weight, based on 100 parts by weight of the total amounts of the components [A], [B] and [C].

In manufacturing the container of the invention, a saturated polyester resin composition prepared by the use of the "virgin saturated polyester" as the saturated polyester [A] and a saturated polyester resin composition prepared by the use of the "regrind of saturated polyester" as the saturated polyester [A] may be blended with each other in an arbitrary proportion.

The saturated polyester resin composition used for the invention is excellent in injection moldability, and can be molded into containers continuously and efficiently.

From such saturated polyester resin composition, containers excellent in not only low-temperature impact strength but also rigidity, weld strength, weathering resistance and fade resistance can be obtained.

In addition to each components described hereinbefore, the saturated polyester resin composition may further contain other weathering stabilizers, pigments, lubricants, heat stabilizers, antistatic agents, water-resistant agents, impact modifiers, dispersants, etc.

The saturated polyester resin composition is prepared by melt kneading the above-mentioned components in accordance with conventionally known processes.

For instance, the saturated polyester resin composition can be prepared by:

a process comprising directly mixing the components in a mixing machine such as tumbling blender or Henschel mixer, and melt kneading the resulting mixture, a process comprising preliminarily preparing a mixture (master batch) of the components [D], [E] and [F], then adding the master batch to a melt kneadate of the components [A], [B] and [C] in such a manner that the amounts of the components [D], [E] and [F] would be finally within the aforementioned ranges, and melt kneading the resulting mixture, and a process comprising directly mixing the master batch of the components [D], [E] and [F] with the components [A], [B] and [C] in a mixing machine.

Container

The container according to the invention can be manufactured by injection molding the saturated polyester resin composition.

For instance, the container can be composed of the saturated polyester resin composition in an injection molding machine by heating the saturated polyester resin composition at a temperature not lower than the melting point of the saturated polyester contained in the composition, e.g., usually 250° to 300° C., preferably 270° to 320° C., to make the composition molten, and injection molding the molten composition in a mold, followed by solidifying the molded product under cooling.

EFFECT OF THE INVENTION

The container according to the invention is composed of the above-mentioned saturated polyester resin composition with high moldability, and hence it is excellent in not only low-temperature impact strength but also rigidity, weld strength, weathering resistance and fade resistance. Such container is neither lowered in the strength nor faded even after used outdoors for a long period of time, and it exhibits excellent properties when used as a transport container, etc.

EXAMPLE

The present invention will be further described with reference to the following examples, but it should be construed that the invention is in no way limited to those examples.

In the examples, various properties were evaluated in the following manner.

(i) Moldability of saturated polyester resin composition

Figure 1A:
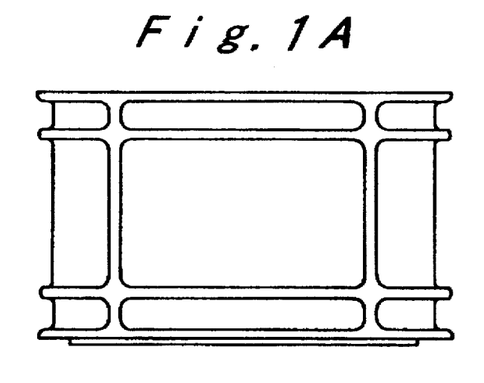
FIG. 1A is a longitudinal side view of the container.
Figure 1B:
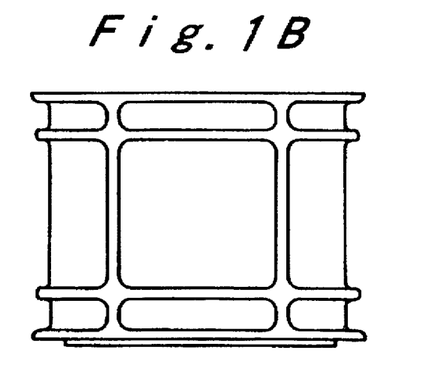
FIG. 1B is another side view thereof.
Figure 1C:
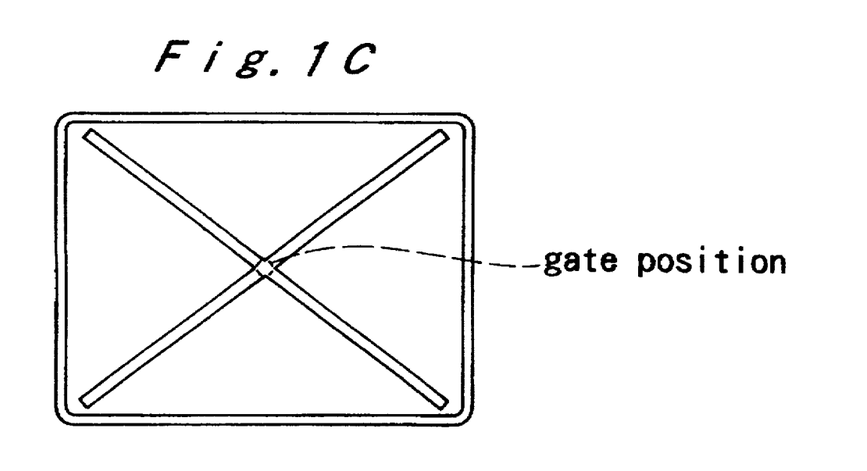
FIG. 1C is a bottom view thereof.

The saturated polyester resin composition was molded into a container shown in FIGS. 1A, 1B and 1C by means of injection molding, to evaluate moldability of the composition. In the injection molding, a mold having one gate at the position corresponding to the center of the bottom of the container was used, and the mold temperature was 20° C.

The moldability was evaluated based on the following classes.

AA: Continuous molding is possible without any problem.

BB1: Continuous molding is impossible because of poor flowability.

BB2: Continuous molding is impossible because of poor releasability.

BB3: Continuous molding is impossible because of occurrence of burn mark or generation of gas.

(ii) Measurement of low-temperature impact strength of container (1) Preparation of specimen A From the container manufactured as above, four strips were cut out at the portion radiately extending from the gate to the 8 cm distant position from the gate, said 8 cm distant position being the farthest among the positions from which the strips were cut out, and the strips were subjected to annealing at 180° C. for 10 minutes, to obtain Izod impact test specimens A (notched, thickness of each specimen: 3 mm).

(2) Measurement of Izod impact strength

Each of the specimens A obtained as above was subjected to Izod impact test (notched) in accordance with ASTM D 256-78, wherein each specimen A was allowed to stand for 20 minutes at −20° C. and was measured in the Izod impact strength at a measuring temperature of −20° C.

Thus, the low-temperature Izod impact strength [kg.cm/cm] was measured.

(iii) Evaluation of rigidity (1) Preparation of specimen B

From the container manufactured as above, two dumbbells (ASTM D 638 TYPE IV dumbbells) were cut out at the portion extending in the lateral direction of the container from the gate to the 12 cm distant position from the gate, said 12 cm distant position being the farthest among the positions from which the dumbbells were cut out, and the dumbbells were subjected to annealing at 180° C. for 10 minutes, to obtain specimens B (thickness of each specimen: 3 mm).

(2) Measurement of initial modulus (E) (evaluation of rigidity)

Each of the specimens B obtained as above was subjected to tensile test in accordance with ASTM D 638 to measure initial modulus (E). In this measurement, the distance between chucks was 64 mm, and the test rate was 5 mm/min.

The initial modulus (E) was determined by drawing a tangent line (auxiliary line) of a curve passing the origin in the load-elongation curve obtained from the tensile test and calculating in accordance with the following equation.

$$E = \frac{F_1}{A} \times \frac{L_0}{L_1}$$

E: initial modulus [kgf/cm$^2$]

$F_1$: load [kgf] at the arbitrary position on the auxiliary line $L_1$: elongation [cm] corresponding to $F_1$ on the auxiliary line $L_0$: distance [cm] between chucks A: minimum sectional area [cm$^2$] of the initial specimen The rigidity was evaluated based on the following classes using the initial modulus (E) [kgf/cm$^2$].

AA: 18,500≦E

BB: 17,000≦E<18,500

CC: 15,000≦E<17,000

DD: E<15,000

(iv) Evaluation of weld strength (1) Preparation of specimen C

Figure 2:
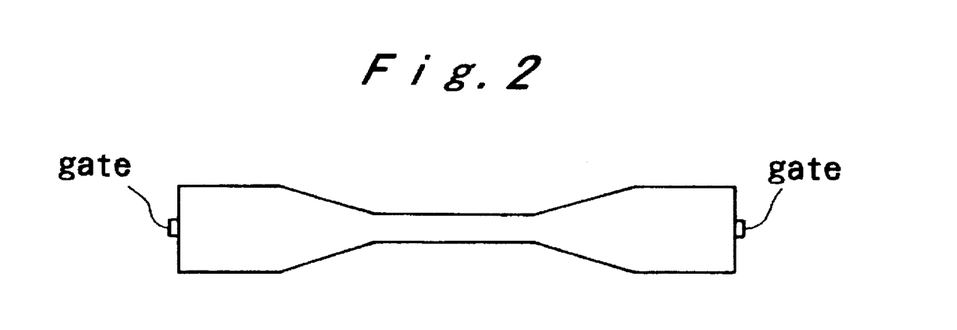
FIG. 2 shows a mold used for preparing a dumbbell specimen C (ASTM D-638 TYPE IV) for use in the examples of the invention.

The saturated polyester resin composition was subjected to injection molding by the use of a mold having two gates (4 mm×3 mm) as shown in FIG. 2, followed by annealing at 180° C. for 10 minutes, to obtain a specimen C (ASTM D 638 TYPE IV dumbbell, thickness: 3 mm).

(2) Measurement of yield stress (YS) (evaluation of weld strength)

The specimen C obtained as above was subjected to tensile test in accordance with ASTM D 638 to measure yield stress (YS). In this measurement, the distance between chucks was 64 mm, and the test rate was 5 mm/min.

The weld strength was evaluated based on the following classes using the measured yield stress (YS) [kgf/cm$^2$].

AA: 430≦YS

BB: 350≦YS<430

CC: YS<350

(v-1) Evaluation of weathering resistance (1) (impact strength)

Each of the above-mentioned Izod impact test specimens A (having been subjected to annealing) was allowed to stand for 3,000 hours in a sunshine carbon arc exposure weatherometer under the conditions of a temperature of 63° C. and occasional raining (18-minute continuous raining per 120 minutes).

Thereafter, each specimen A was subjected to Izod impact test (−20° C.) in the same manner as described in the above measurement (ii) to evaluate the weathering resistance.

(v-2) Evaluation of weathering resistance (2) (drop test)

The container obtained as above was subjected to annealing in an air oven at 180° C. for 10 minutes. After the container was allowed to stand outdoors for 2 years, it was gravity-dropped ten times on the floor from the height of 4 m at 25° C. in such a manner that the bottom surface was kept parallel when dropped. The container was observed on the occurrence of cracks by the drop test.

AA: No crack was observed in the container.

BB: Cracks were observed in the container.

(v-3) Evaluation of weathering resistance (3) (bucking test)

The container obtained as above was subjected to annealing in an air oven at 180° C. for 10 minutes. After the container was allowed to stand outdoors for 2 years, it was subjected to buckling test at 25° C. using a universal testing machine. The buckling strength was expressed as the maximum strength given when the container was compressed at a rate of 10 mm/min.

(vi) Evaluation of fade resistance

After each of the specimens A was allowed to stand in the sunshine carbon arc exposure weatherometer in the same manner as described in the above evaluation (v), and the color of each specimen was evaluated based on the following classes.

AA: No fading of the pigment was observed.

BB: Fading of the pigment was observed.

Example 1–12

The saturated polyester resin [A], the metallic salt of ethylene/unsaturated carboxylic acid copolymer [B], the modified ethylene/α-olefin copolymer rubber [C], the benzotriazole type weathering stabilizer [D] and the hindered amine type weathering stabilizer [E], all shown in Table 1, and a quinophthalone type yellow pigment and titanium oxide were dry blended, and the resulting blend was granulated by a twin-screw extruder (preset temperature: 275° C.) to obtain a saturated polyester resin composition. The saturated polyester resin composition thus obtained was evaluated on the aforementioned properties.

The results are set forth in Table 2.

Example 13

The saturated polyester resin [A], the metallic salt of ethylene/unsaturated carboxylic acid copolymer [B], the modified ethylene/α-olefin copolymer rubber [C] and the benzotriazole type weathering stabilizer [D], all shown in Table 1, and a quinophthalone type yellow pigment and titanium oxide were dry blended, and the resulting blend was granulated by a twin-screw extruder (preset temperature: 275° C.) to obtain a saturated polyester resin composition. The saturated polyester resin composition thus obtained was evaluated on the aforementioned properties.

The results are set forth in Table 2.

Example 14

The saturated polyester resin [A], the metallic salt of ethylene/unsaturated carboxylic acid copolymer [B], the modified ethylene/α-olefin copolymer rubber [C], the benzotriazole type weathering stabilizer [D], the hindered amine type weathering stabilizer [E] and the carbodiimide compounds [F], all shown in Table 1, and a quinophthalone type yellow pigment and titanium oxide were dry blended, and the resulting blend was granulated by a twin-screw extruder (preset temperature: 275° C.) to obtain a saturated polyester resin composition. The saturated polyester resin composition thus obtained was evaluated on the aforementioned properties.

The results are set forth in Table 2.

Comparative Examples 1–14

A saturated polyester resin composition composed of the components shown in Table 1 (further containing a quinophthalone type yellow pigment and titanium oxide) was obtained in a manner similar to that of Example 1. The saturated polyester resin composition thus obtained was evaluated on the aforementioned properties.

The results are set forth in Table 2.

The components used in the above examples and comparative examples are as follows.

[A-1]: homopolyethylene terephthalate, [η]=0.79 dl/g

[A-2]: homopolyethylene terephthalate, [η]=1.1 dl/g

[A-3]: terephthalic acid/isophthalic acid (90/10, % by mol) copolyester

[A-4]: ethylene glycol/cyclohexanedimethanol (90/10%, by mol) copolyester

[b] Metallic salt of ethylene/unsaturated carboxylic acid copolymer

[B-1]: Hi-milan 1707 (sodium salt, available from Mitsui Dupont Polychemical Co.)

[B-2]: Hi-milan 1706 (zinc salt, available from Mitsui Dupont Polychemical Co.)

[C] Modified ethylene/α-olefin copolymer rubber

[C-1]: maleic acid modified ethylene/propylene copolymer rubber (an amount of graft modified maleic acid: 1% by weight)

[C-2]: maleic acid modified ethylene/propylene copolymer rubber (an amount of graft modified maleic acid: 2% by weight)

[C-3]: Tafmer P0680 (unmodified ethylene/α-olefin copolymer rubber)

[C-4]: Crayton FG1901X (maleic acid modified hydrogenation type polyethylene/butylene-styrene block copolymer, available from Shell Co.)

[C-5]: Hytrel 4057 (polyester-polyether elastomer, available from Toray Dupont Co.)

[D] Benzotriazole type weathering stabilizer

[D-1]: TINUVIN 326 (2-(2'-hydroxy-3'-tert-butyl-5'-methylphenyl)-5-chlorobenzotriazole, available from Ciba Geigy Ltd.)

[D-2]: TINUVIN 234 (2-(2'-hydroxy-3',5'-bis(2-phenylisopropyl)phenyl)benzotriazole, available from Ciba Geigy Ltd.)

[D-3]: Cyasorb UV5411 (2-(2'-hydroxy-5'-tert-octylphenyl)benzotriazole, available from Cyanamid Co.)

[E-1]: Sanol LS770 (available from Sankyo Co., Ltd.)

[E-2]: Chimasorb 119FL (oligomer type, available from Ciba Geigy Ltd.)

[E-3]: Chimasorb 944 (oligomer type, available from Ciba Geigy Ltd.)

[F] Carbodiimide compound

Stabaczole P (high-molecular weight type, available from Hiraizumi Yoko K.K.)

Pigment

Quinophthalone type yellow pigment (Irugazine Yellow, available from Ciba Geigy Ltd.)

The quinophthalone type yellow pigment was used in each of the compositions in an amount of 0.11 part by weight based on 100 parts by weight of the total amounts of the components [A], [B] and [C].

Titanium oxide (rutile titanium oxide, available from Ishihara Sangyo K.K.)

The titanium oxide was used in each of the compositions in an amount of 0.25 part by weight based on parts by weight of the total amounts of the components [A], [B] and [C].

TABLE 1

| | Component (part(s) by weight) | | | | | |
|---|---|---|---|---|---|---|
| | [A] | [B] | [C] | [D] | [E] | [F] |
| Ex. 1 | [A-1] (80) | [B-1] (10) | [C-1] (10) | [D-1] (0.3) | [E-1] (0.3) | |
| Ex. 2 | [A-1] (60) | [B-1] (20) | [C-1] (20) | [D-1] (0.3) | [E-1] (0.3) | |
| Ex. 3 | [A-1] (75) | [B-1] (5) | [C-1] (20) | [D-1] (0.3) | [E-1] (0.3) | |
| Ex. 4 | [A-2] (80) | [B-1] (10) | [C-1] (10) | [D-1] (0.3) | [E-1] (0.3) | |
| Ex. 5 | [A-3] (80) | [B-1] (10) | [C-1] (10) | [D-1] (0.3) | [E-1] (0.3) | |
| Ex. 6 | [A-4] (80) | [B-1] (10) | [C-1] (10) | [D-1] (0.3) | [E-1] (0.3) | |
| Ex. 7 | [A-1] (80) | [B-2] (10) | [C-1] (10) | [D-1] (0.3) | [E-1] (0.3) | |
| Ex. 8 | [A-1] (80) | [B-1] (10) | [C-2] (10) | [D-1] (0.3) | [E-1] (0.3) | |
| Ex. 9 | [A-1] (80) | [B-1] (10) | [C-1] (10) | [D-2] (0.3) | [E-1] (0.3) | |
| Ex. 10 | [A-1] (80) | [B-1] (10) | [C-1] (10) | [D-3] (0.3) | [E-1] (0.3) | |
| Ex. 11 | [A-1] (80) | [B-1] (10) | [C-1] (10) | [D-1] (0.3) | [E-2] (0.3) | |
| Ex. 12 | [A-1] (80) | [B-1] (10) | [C-1] (10) | [D-1] (0.3) | [E-3] (0.3) | |
| Ex. 13 | [A-1] (80) | [B-1] (10) | [C-1] (10) | [D-1] (0.6) | | |
| Ex. 14 | [A-1] (80) | [B-1] (10) | [C-1] (10) | [D-1] (0.3) | [E-1] (0.3) | [F] (0.3) |
| Comp. Ex. 1 | [A-1] (100) | | | | | |
| Comp. Ex. 2 | [A-1] (80) | [B-1] (20) | | [D-1] (0.3) | [E-1] (0.3) | |
| Comp. Ex. 3 | [A-1] (70) | | [C-1] (30) | [D-1] (0.3) | [E-1] (0.3) | |
| Comp. Ex. 4 | [A-1] (80) | [B-1] (10) | [C-1] (10) | | | |

TABLE 1-continued

| | Component (part(s) by weight) | | | | | |
|---|---|---|---|---|---|---|
| | [A] | [B] | [C] | [D] | [E] | [F] |
| Comp. Ex. 5 | [A-1] (80) | [B-1] (10) | [C-1] (10) | | [E-1] (0.3) | |
| Comp. Ex. 6 | [A-1] (80) | [B-1] (10) | [C-3] (10) | [D-1] (0.3) | [E-1] (0.3) | |
| Comp. Ex. 7 | [A-1] (80) | [B-1] (10) | [C-4] (10) | [D-1] (0.3) | [E-1] (0.3) | |
| Comp. Ex. 8 | [A-1] (80) | [B-1] (10) | [C-5] (10) | [D-1] (0.3) | [E-1] (0.3) | |
| Comp. Ex. 9 | [A-1] (80) | | [C-3] (20) | [D-1] (0.3) | [E-1] (0.3) | |
| Comp. Ex. 10 | [A-1] (80) | | [C-4] (20) | [D-1] (0.3) | [E-1] (0.3) | |
| Comp. Ex. 11 | [A-1] (80) | | [C-5] (20) | [D-1] (0.3) | [E-1] (0.3) | |
| Comp. Ex. 12 | [A-1] (100) | | | [D-1] (0.3) | [E-1] (0.3) | [F] (1.0) |
| Comp. Ex. 13 | [A-1] (80) | [B-1] (20) | | [D-1] (0.3) | [E-1] (0.3) | [F] (1.0) |
| Comp. Ex. 14 | [A-1] (80) | | [C-1] (20) | [D-1] (0.3) | [E-1] (0.3) | [F] (1.0) |

TABLE 2

| | (i) Moldability | (ii) Izod impact strength (−20° C., notched) [kg · cm/cm] | (iii) Rigidity Initial modules [kgf/cm²] | (iv) Weld strength |
|---|---|---|---|---|
| Example 1 | AA | 6 | AA | AA |
| Example 2 | AA | 8 | BB | AA |
| Example 3 | AA | 6 | BB | AA |
| Example 4 | AA | 7 | AA | AA |
| Example 5 | AA | 7 | AA | AA |
| Example 6 | AA | 8 | AA | AA |
| Example 7 | AA | 6 | AA | AA |
| Example 8 | AA | 7 | AA | AA |
| Example 9 | AA | 6 | AA | AA |
| Example 10 | AA | 7 | AA | AA |
| Example 11 | AA | 6 | AA | AA |
| Example 12 | AA | 6 | AA | AA |
| Example 13 | AA | 6 | AA | AA |
| Example 14 | AA | 11 | AA | AA |

| | (v) Weathering resistance | | | |
|---|---|---|---|---|
| | Izod impact strength (−20° C.) [kg · cm/cm] | Drop test | Buckling test [ton] | Fade resistance |
| Example 1 | 4 | AA | 3.6 | AA |
| Example 2 | 5 | AA | 2.5 | AA |
| Example 3 | 4 | AA | 2.4 | AA |
| Example 4 | 5 | AA | 3.5 | AA |
| Example 5 | 5 | AA | 3.8 | AA |
| Example 6 | 6 | AA | 3.5 | AA |
| Example 7 | 4 | AA | 3.6 | AA |
| Example 8 | 5 | AA | 3.5 | AA |
| Example 9 | 4 | AA | 3.7 | AA |
| Example 10 | 5 | AA | 3.6 | AA |
| Example 11 | 4 | AA | 3.5 | AA |
| Example 12 | 4 | AA | 3.6 | AA |
| Example 13 | 4 | AA | 2.5 | AA |
| Example 14 | 7 | AA | 3.7 | AA |

TABLE 2-1

| | (i) Moldability | (ii) Izod impact strength (−20° C., notched) [kg · cm/cm] | (iii) Rigidity Initial modules [kgf/cm²] | (iv) Weld strength |
|---|---|---|---|---|
| Comparative Example 1 | BB2 | 3 | AA | AA |
| Comparative Example 2 | BB1 | 5 | CC | BB |
| Comparative Example 3 | BB2 | 5 | DD | CC |
| Comparative Example 4 | AA | 6 | AA | AA |
| Comparative Example 5 | AA | 7 | AA | AA |
| Comparative Example 6 | AA | 5 | AA | AA |
| Comparative Example 7 | BB3 | 5 | AA | AA |
| Comparative Example 8 | BB3 | 6 | AA | AA |
| Comparative Example 9 | BB2 | 4 | DD | AA |
| Comparative Example 10 | BB2, BB3 | 6 | DD | AA |
| Comparative Example 11 | BB2, BB3 | 6 | DD | AA |
| Comparative Example 12 | BB1, BB2 | 3 | AA | AA |
| Comparative Example 13 | BB1, BB3 | 8 | CC | AA |
| Comparative Example 14 | BB2 | 8 | DD | AA |

| | (v) Weathering resistance | | | |
|---|---|---|---|---|
| | Izod impact strength (−20° C.) [kg · cm/cm] | Drop test | Buckling test [ton] | Fade resistance |
| Comparative Example 1 | less than 1 | BB | 0.5 | BB |
| Comparative Example 2 | less than 1 | BB | 1.1 | BB |
| Comparative Example 3 | less than 1 | BB | 0.9 | BB |
| Comparative Example 4 | less than 1 | BB | 0.8 | BB |
| Comparative Example 5 | 1 | BB | 1.0 | BB |
| Comparative Example 6 | less than 1 | BB | 0.7 | BB |
| Comparative Example 7 | less than 1 | BB | 0.6 | BB |
| Comparative Example 8 | less than 1 | BB | 0.7 | BB |
| Comparative Example 9 | 2 | BB | 0.5 | BB |
| Comparative Example 10 | less than 1 | BB | 0.4 | BB |
| Comparative Example 11 | less than 1 | BB | 0.4 | BB |
| Comparative Example 12 | 1 | BB | 0.6 | BB |
| Comparative Example 13 | 2 | BB | 1.5 | BB |
| Comparative Example 14 | 1 | BB | 1.3 | BB |

What is claimed is:

1. A weather resistant transport container composed of a saturated polyester resin composition comprising:

(A) a saturated polyester consisting essentially of ethylene terephthalate which has an intrinsic viscosity ($\eta$) of 0.5 to 1.4 dl/g, in an amount of 50 to 95 parts by weight;

(B) a metallic salt of an ethylene/unsaturated carboxylic acid copolymer in an amount of 0.5 to 20 parts by weight;

(C) a modified ethylene/α-olefin copolymer rubber obtained by graft modifying an ethylene/α-olefin copolymer rubber with an unsaturated carboxylic acid or its derivative, in an amount of 0.5 to 30 parts by weight;

(D) a benzotriazole type weathering stabilizer in an amount of 0.01 to 2.0 parts by weight based on 100 parts by weight of the total amounts of the components (A), (B) and (C);

(E) a hindered amine type weathering stabilizer in an amount of 0 to 2.0 parts by weight based on 100 parts by weight of the total amounts of the components (A), (B) and (C); and optionally (F) a carbodiimide compound in an amount of 0.01 to 5.0 parts by weight based on 100 parts by weight of the total amounts of the components (A), (B) and (C).

2. The container as claimed in claim 1, wherein the unsaturated carboxylic acid for forming the metallic salt of an ethylene/unsaturated carboxylic acid copolymer (B) is an acrylic acid and/or a methacrylic acid.

3. The container as claimed in claim 1, wherein the modified ethylene/α-olefin copolymer rubber (C) is an ethylene/α-olefin copolymer rubber graft modified with a maleic acid or maleic anhydride.

4. The container as claimed in claim 3, wherein the modified ethylene/α-olefin copolymer rubber (C) is a modified ethylene/propylene copolymer rubber.

5. The container as claimed in claim 1, wherein the saturated polyester (A) has a melting temperature of 210° to 265° C.

6. The container as claimed in claim 1, wherein the graft modified ethylene/propylene copolymer rubber (C) has a low crystallinity of less than 40% and an intrinsic viscosity (η) of 0.5 to 7 dl/g.

7. A weather resistant transport container manufactured by injection molding composed of a saturated polyester resin composition comprising:

(A) a saturated polyester which consists essentially of terephthalic acid and ethylene glycol and has an intrinsic viscosity (η) of 0.55 to 1.0 dl/g, in an amount of 60 to 90 parts by weight;

(B) a metallic salt of an ethylene/unsaturated carboxylic acid copolymer in an amount of 5 to 20 parts by weight, wherein the unsaturated carboxylic acid for forming the metallic salt of an ethylene/unsaturated carboxylic acid copolymer (B) is an acrylic acid and/or a methacrylic acid;

(C) a modified ethylene/α-olefin copolymer rubber obtained by graft modifying an ethylene/α-olefin copolymer rubber with an unsaturated carboxylic acid in an amount of 5 to 30 parts by weight, wherein the modified ethylene/α-olefin copolymer rubber (C) is an ethylene/propylene copolymer rubber graft modified with a maleic acid or maleic anhydride;

(D) a benzotriazole weathering stabilizer in an amount of 0.05 to 1.0 parts by weight based on 100 parts by weight of the total amounts of the components (A), (B) and (C);

(E) a hindered amine weathering stabilizer in an amount of 0.05 to 1.0 parts by weight based on 100 parts by weight of the total amounts of the components (A), (B) and (C); and (F) a carbodiimide compound in an amount of 0.02 to 2.0 parts by weight based on 100 parts by weight of the total amounts of the components (A), (B) and (C).

8. The container as claimed in claimed 7 wherein the saturated polyester (A) has a melting temperature of 220° to 260° C.

9. The container as claimed in claim 7 wherein the graft modified ethylene/propylene copolymer rubber (C) has a low crystallinity of less than 30% and an intrinsic viscosity (η) of 0.7 to 5 dl/g.

* * * * *